United States Patent
Madpuwar (10) Patent No.: US 8,239,625 B2
(45) Date of Patent: Aug. 7, 2012

(54) PARITY GENERATOR FOR REDUNDANT ARRAY OF INDEPENDENT DISCS TYPE MEMORY

(75) Inventor: Girish A. Madpuwar, Bangalore (IN)

(73) Assignee: Freescale Semiconductor, Inc., Austin, TX (US)

( * ) Notice: Subject to any disclaimer, the term of this patent is extended or adjusted under 35 U.S.C. 154(b) by 356 days.

(21) Appl. No.: 12/692,637

(22) Filed: Jan. 24, 2010

(65) Prior Publication Data

US 2011/0185119 A1    Jul. 28, 2011

(51) Int. Cl.
*G06F 12/16* (2006.01)
(52) U.S. Cl. .......... 711/114; 711/E12.103; 714/800
(58) Field of Classification Search .......... None
See application file for complete search history.

(56) References Cited

U.S. PATENT DOCUMENTS

| | | | |
|---|---|---|---|
| 5,737,744 A | 4/1998 | Callison et al. | |
| 6,918,007 B2 | 7/2005 | Chang et al. | |
| 2005/0050384 A1* | 3/2005 | Horn | 714/6 |
| 2006/0156211 A1* | 7/2006 | Edirisooriya et al. | 714/800 |
| 2007/0028145 A1* | 2/2007 | Gerhard et al. | 714/36 |
| 2007/0088864 A1 | 4/2007 | Foster | |
| 2008/0148025 A1* | 6/2008 | Gopal et al. | 712/225 |
| 2010/0095150 A1* | 4/2010 | Daikokuya et al. | 714/6 |

\* cited by examiner

*Primary Examiner* — Edward Dudek, Jr.
*Assistant Examiner* — Ralph A Verderamo, III
(74) *Attorney, Agent, or Firm* — Charles Bergere (57) ABSTRACT

In a Redundant Array of Independent Discs (RAID) type memory, dual parities P and Q are generated by a dual XOR engine that performs a plain XOR operation for parity P and a weighted XOR operation for parity Q. The plain and weighted XOR operations may be performed in a single pass.

16 Claims, 10 Drawing Sheets

PARITY GENERATOR FOR REDUNDANT ARRAY OF INDEPENDENT DISCS TYPE MEMORY

BACKGROUND OF THE INVENTION

The present invention relates to a computer data storage scheme known as a Redundant Array of Independent Discs (RAID), and, in particular to a method and apparatus for generating parity for a RAID array.

RAID denotes a data storage scheme that can divide and replicate data across multiple hard disc drives. Various levels of RAID are denoted by a number following the word RAID, e.g., RAID-0, RAID-1, etc. The various levels of RAID are characterized by two key aspects namely data reliability or fault tolerance and increased input/output performance. Increased performance is obtained by distributing data over several hard disc drives, known as striping, thus distributing the load over more hardware. Data reliability or fault tolerance is obtained by redundancy, where additional information is stored so that data can be recovered in the event of failure of a hard disk drive.

Redundancy is achieved by use of parity blocks. If a drive in a RAID array fails, data blocks and a parity block from surviving drives may be combined to reconstruct the data in the failed drive.

A parity block may be generated by using the Boolean XOR function, for example parity data for two drives, Drive 1: 01101101; Drive 2: 11010100 is calculated as: Parity data=01101101 XOR 11010100=10111001. The resulting parity data is stored in a third or parity drive. Should any of the three drives fail the contents of the failed drive may be reconstructed by taking data from the surviving drives (Drive 3: 10111001; Drive 1: 01101101) and subjecting them to the same XOR calculation. Supposing drive 2 fails, drive 2 may be reconstructed as follows: Drive 2=10111001 XOR 01101101=11010100.

Performance of an individual hard disk drive is difficult to improve beyond fault tolerance. Individual physical hard disk drives are inherently slow and have a limited life-cycle. Nevertheless, fault-tolerance and performance of the system as a whole may be improved significantly through a suitable combination of physical hard disk drives.

RAID is a proven way to increase Mean Time Between Failures (MTBF) of an array of storage discs used in servers/computers. Levels of RAID include: RAID-1, RAID-2, RAID-4, RAID-5, RAID-6, RAID-10, RAID01, etc. RAID-5 includes a striped set with distributed parity. Upon drive failure, data in the failed drive may be reconstructed from the distributed parity such that the drive failure may be masked from the end user. RAID-5 can tolerate one disk failure. RAID-6 extends RAID-5 by adding an additional parity block, using block level striping with two parity blocks distributed across all member discs. Two parities may protect against two simultaneous disc failures, thereby improving reliability. Thus, RAID-6 can tolerate two simultaneous disc failures.

Although, the terms reliability and fault tolerance are often used interchangeably in describing RAID schemes, there is a distinction between them. Reliability refers to the likelihood that an individual drive or drive array will continue to function without experiencing a failure. Reliability is typically measured over some period of time. Fault tolerance, on the other hand, is an ability of an array to withstand and recover from a drive failure. Fault tolerance is provided by some sort of redundancy including mirroring, parity, or a combination of both. Fault tolerance is typically measured by the number of drives that can fail without causing an entire array to fail.

A bundle of physical hard discs may be brought together by a RAID controller. The RAID controller may distribute data over several physical hard disks and may be completely hidden to an associated server or computer. The RAID controller may store redundant information. If a physical hard disk fails, its data may be reconstructed from the hard disks that survive. The RAID controller may initiate this process automatically. If a hard disk drive fails, the RAID controller may immediately begin to reconstruct the data from a remaining intact disk into a hot spare disk. Recreation of data from a defective hard disk may take place at the same time that read and write operations of the server take place to the bundle of hard disks.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION OF THE INVENTION

According to one aspect of the present invention an apparatus for generating dual parities P and Q for a RAID disk array including a dual XOR engine for performing a plain XOR operation for parity P and for performing a weighted XOR operation for parity Q is provided. The plain and weighted XOR operations are performed in a single pass. The apparatus may include a memory controller having a memory addressing arrangement including a dual XOR field parameter and an offset field parameter for encoding instructions for generating said dual parities. The dual parities may be represented by two respective write addresses. The dual XOR engine may be adapted to perform plain and weighted XOR operations during a Write XOR operation (WXOR). The WXOR operation may include a memory mapped Read-Modify-Write operation.

The dual XOR engine may include a memory controller including a WXOR_BASE field and a WXOR_LENGTH field for defining a window such that the controller interprets data in the window as instructions for generating write addresses for the dual parities. The dual XOR engine may include a memory controller including a WXOR_DEST field and a WXOR_MASK field for defining addresses for the plain and weighted XOR operations. An address may be defined by the WXOR_DEST field plus an offset, wherein the offset is defined by WXOR_MASK plus a memory address. An address may be defined by the WXOR_BASE field plus a memory address.

According to a further aspect of the present invention there is provided a method for generating dual parities P and Q for a RAID disk array comprising: performing a plain XOR operation for parity P; and performing a weighted XOR operation for parity Q, wherein said plain and said weighted XOR operations are performed in a single pass.

Figure 1:
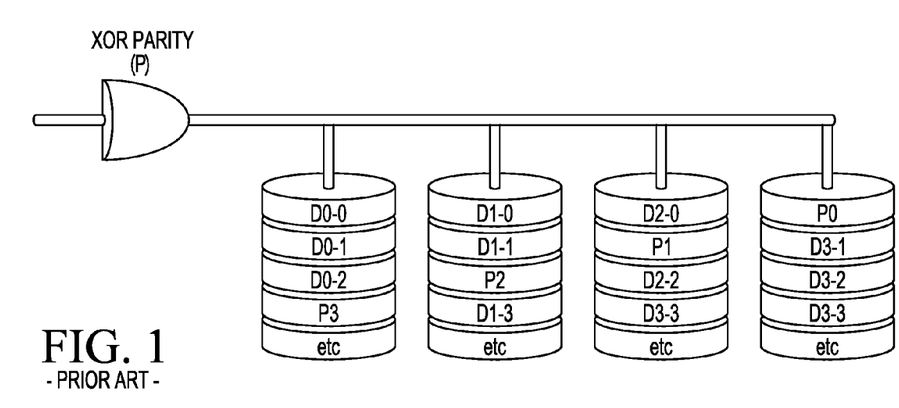
FIG. 1 shows one example of data organization for a RAID-5 scheme.

Referring now to FIG. 1, an entire data block may be written on a data disk. Parity (P) for blocks in the same rank may be generated on Writes and recorded in a distributed location and checked on Reads. RAID Level 5 requires a minimum of 3 drives to implement and may tolerate one disk failure.

Parity Pn for block n may be calculated by the expression:

$$Pn = \bigoplus_{i=0}^{n-1} D_i \quad (1)$$

where $\oplus$ represents Galois Field addition/XOR.

RAID Level 6 requires a minimum of 4 drives to implement and may tolerate two simultaneous disk failures.

Figure 2:
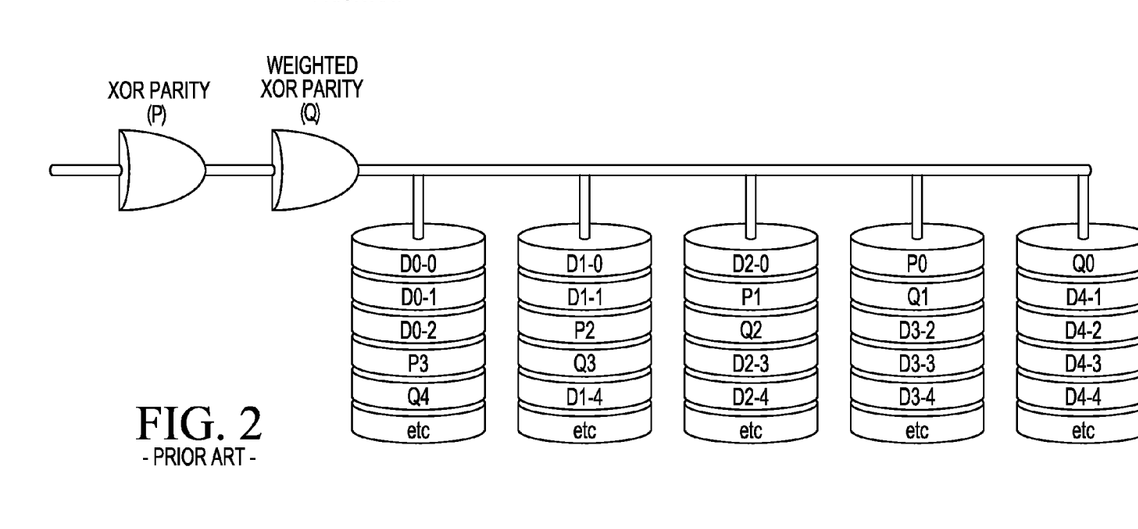
FIG. 2 shows one example of data organization for a RAID-6 scheme.

Referring now to FIG. 2, two independent parity computations (P, Q) are used to provide protection against double disk failure. Two separate algorithms may be employed to calculate parity computations Pn, Qn respectively. A plain XOR may be performed for parity computation Pn. Parity computation Pn for block n may be calculated by the expression:

$$Pn = \bigoplus_{i=0}^{n-1} D_i \quad (2)$$

A weighted XOR may be performed for parity computation Qn. Parity Qn for block n may be calculated by the expression:

$$Qn = \bigoplus_{i=0}^{n-1} g^i \otimes D_i \quad (3)$$

wherein:
$g^y$ represents Galois Field coefficient:
$\otimes$ represents Galois Field multiplication
$\oplus$ represents Galois Field addition/XOR Using a RAID-6 scheme two failed disks Dx and Dy may be recovered by solving the following equations:

$$D_x = \lfloor A_x \otimes (P \oplus P_{xy}) \oplus B_x \otimes (Q \oplus Q_{xy}) \rfloor \quad (4)$$

$$D_y = [A_y \otimes (P \oplus P_{xy}) \oplus B_y \otimes (Q \oplus Q_{xy})] \quad (5)$$

Figure 3:
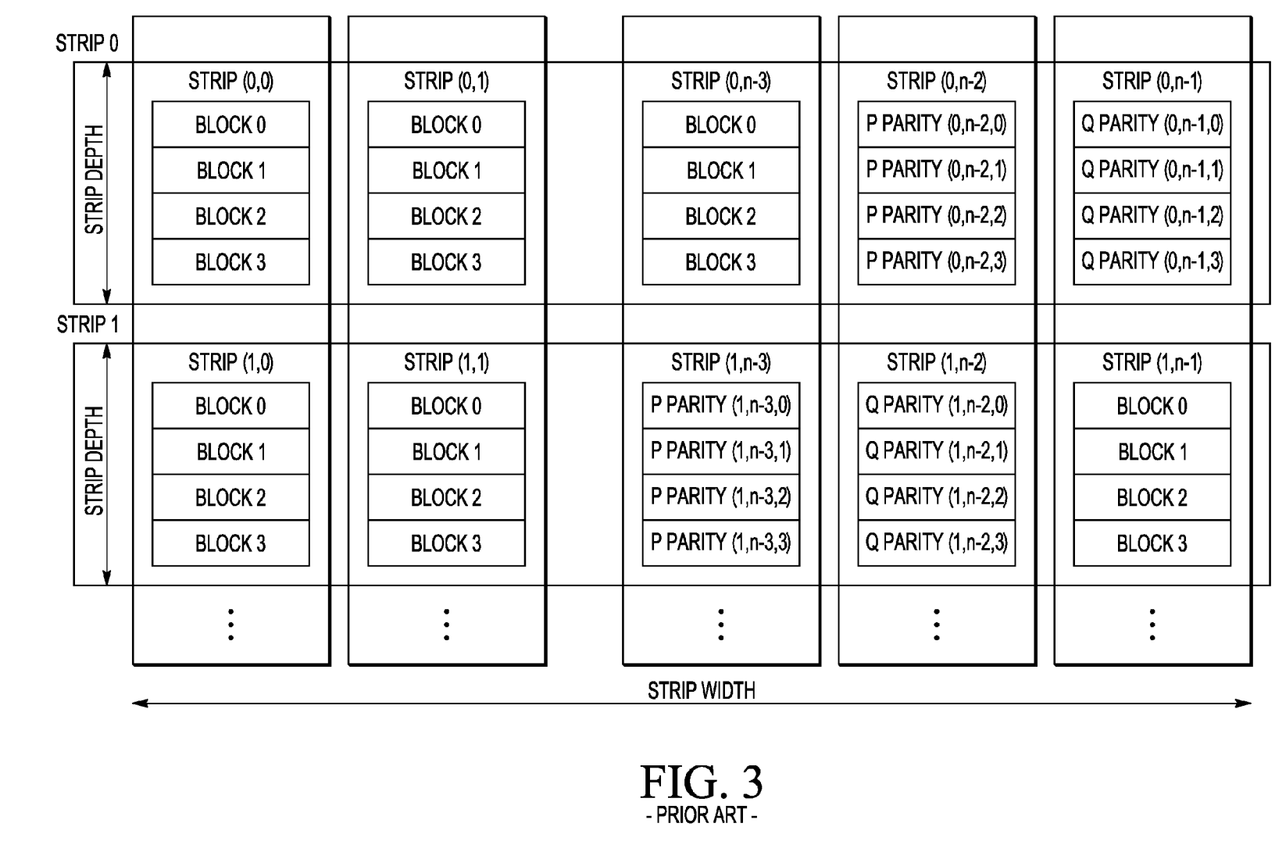
FIG. 3 shows examples of data organized in terms of strip and stripe.

-continued where $A_x = \dfrac{g^y}{g^x \oplus g^y}$;

$A_y = \dfrac{g^x}{g^x \oplus g^y}$;

$B_x = B_y = \dfrac{1}{g^x \oplus g^y}$;

$P_{xy} = \bigoplus_{i=0, i \neq x, i \neq y}^{n-1} D_i$;

$Q_{xy} = \bigoplus_{i=0, i \neq x, i \neq y}^{n-1} (g^i \otimes D_i)$ $g^y$ represents Galois Field coefficient
$\otimes$ represents Galois Field multiplication
$\oplus$ represents Galois Field addition/XOR Referring to FIG. 3 the data in a hard disk drive may be organized in terms of strip and stripe. Each strip may be further subdivided into a smaller granularity, in terms of a block. Each block may be known as a sector and may typically represent the smallest amount of data which may be transferred to and from a drive.

User access to a drive may be translated to one of the following operations in RAID, Full stripe write and Partial stripe write. In the event of a disk failure the RAID controller may initiate a rebuild process. The RAID controller may also run a background data correctness check.

As noted above a plain XOR may be performed for parity P and a weighted XOR may be performed for parity Q. Plain/weighted XOR may be performed by a Write XOR (WXOR) operation. The WXOR operation may include a memory mapped Read-Modify-Write operation.

Typically in an SoC (System on Chip) WXOR hardware may be placed close to a memory controller. A WXOR operation may be enabled if the address on the system bus falls in a predefined address range. Predefined parameters may be included in the reserved bits of the system address bus for this purpose.

Prior art approaches support either plain-XOR or weighted-XOR, one at a time. So to support dual parity RAID-6 with a prior art approach, two commands have to be initiated with the same data. Consequently a prior art WXOR operation typically requires two separate passes since dual parity needs to be generated.

According to one aspect of the present invention dual parity may be generated in a single pass by using a new address bit encoding scheme to support dual parity generation. This may require only an incremental change to a memory controller associated with an SoC to support dual parity generation.

Figure 4:
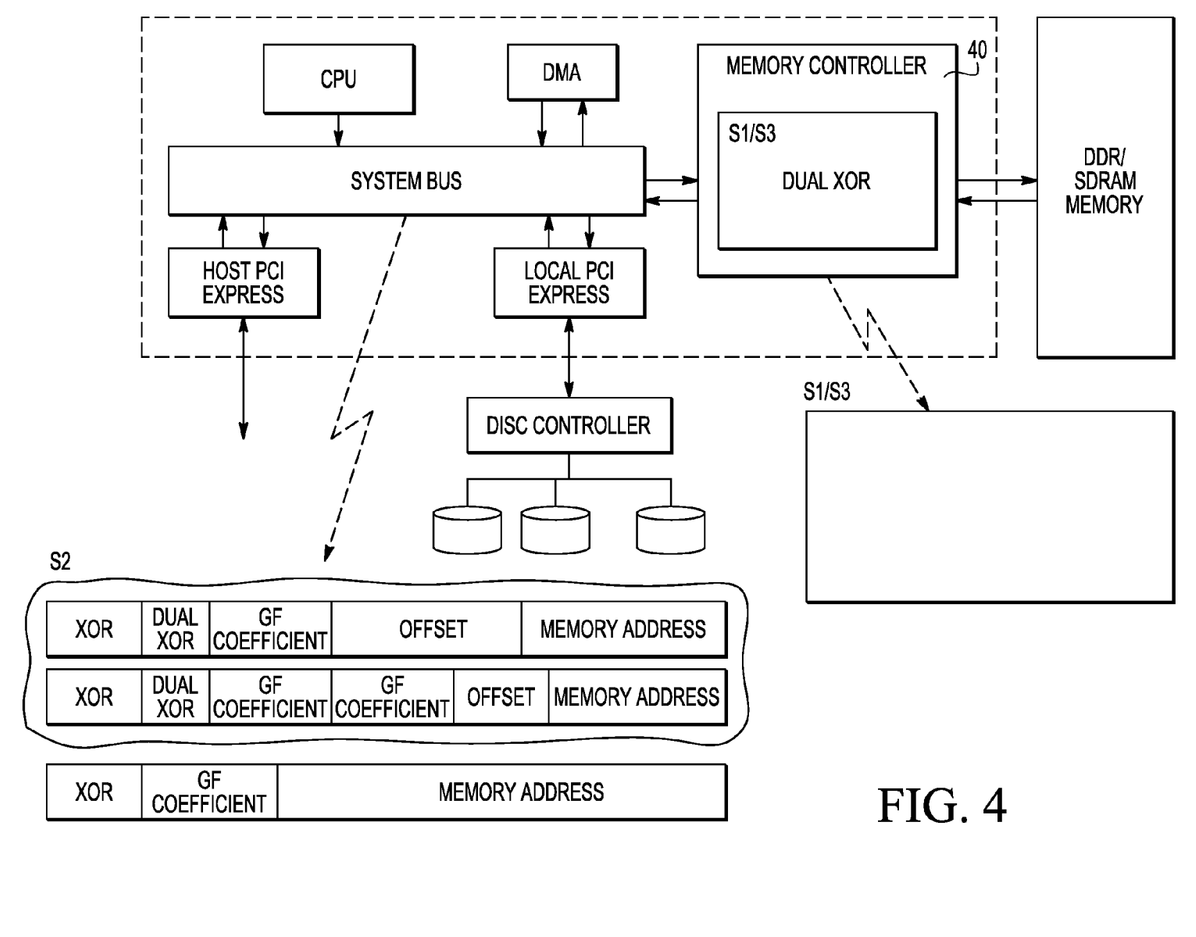
FIG. 4 shows a diagrammatical representation of an arrangement for generating dual parity in a single pass.

Referring to FIG. 4, the memory controller 40 may include a streaming concurrent dual XOR generating logic engine S1/S3. Preferably the dual XOR engine is integrated into the memory controller of the SoC. New parameters including a "Dual XOR bit" and an "offset field" may be used in encoding the address. The presence of "Dual XOR bit" and "offset field" parameters in the address encoding may be interpreted by the dual XOR engine as instructions to generate two unique write addresses.

Figure 5A:
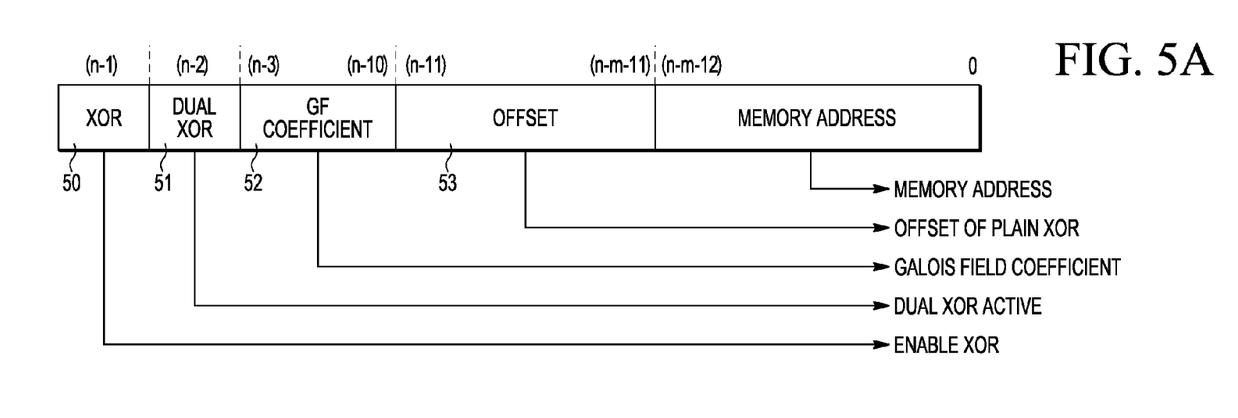
FIGS. 5A and 5B show address encoding using new parameters.

FIG. 5A shows one example of use of new parameters 50-53 in address encoding. The Memory addressing scheme may be arranged as follows:

If {XOR}=0: address range [(n−2):0] contains the usual memory address.
If {XOR}=1 and {dual-XOR}=0: Plain XOR is active.

If {XOR}=1 and {dual-XOR}=1: Dual XOR is active.
Since many address bits in the address field are used for special encoding, this has the effect of reducing the "Memory address" range. As shown in FIG. 5A, out of "n" address bits only the address range [n-m-12:0] is actually available for addressing. This means that a subset only of the entire address range can be accessed. Also new address bit encoding requires changes in software, addressing scheme and memory management.

Figure 9:
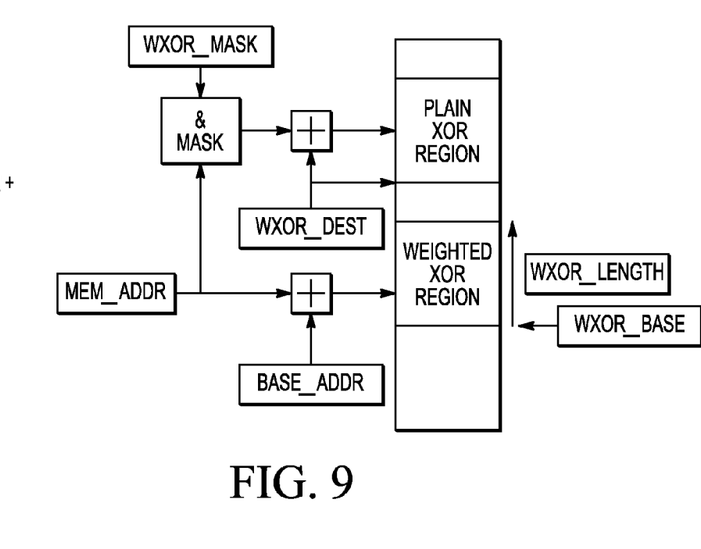
FIG. 9 shows a logic circuit for performing dual XOR according to an embodiment of the present invention.

Referring to FIG. 9, the address bit may be added to BASE_ADDR and the resulting address may reside in any section on an "n" bit address range. Since BASE_ADDR is static it may allow the result to be placed anywhere in memory. Hence, BASE_ADDR may allow an entire memory to be swept and the output result placed anywhere in the memory. The proposed logic may interpret memory address, base address and associated parameters and perform dual XOR.

Plain XOR includes the operation: D=D^S
Weighted XOR includes the operation: D=D^gS
where D denotes destination, S denotes Source, and ^ denotes XOR operation.

Figure 7:
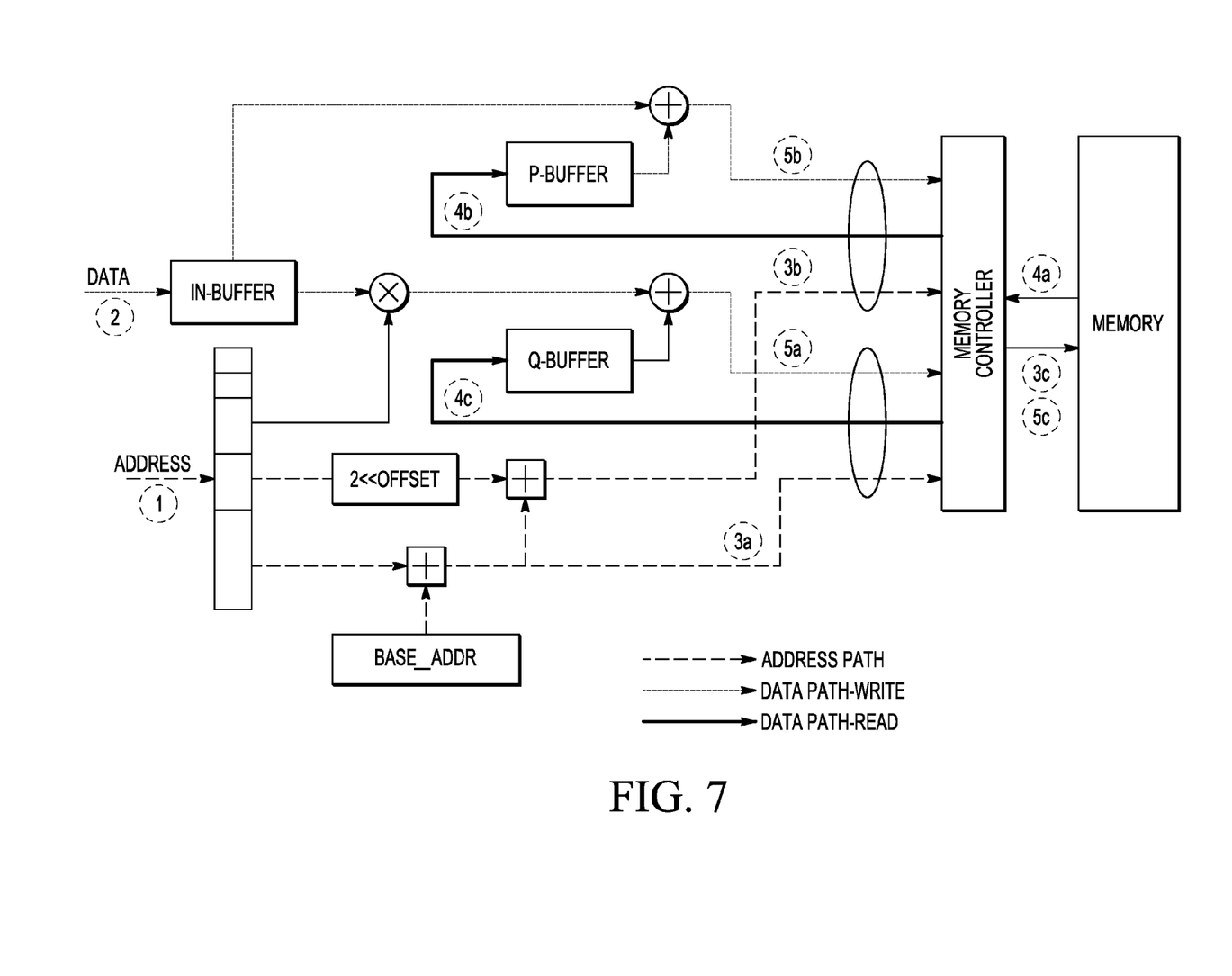
FIG. 7 shows a logic circuit and steps for writing dual XOR to memory.

Referring to FIG. 7, dual XOR may be written to memory as follows:
  Step 1 is a Write address phase, which occurs first;
  Step 2 is a Write data phase followed by a write address phase (step 1). Alternatively step 2 may take place simultaneously with step 1 (implementation dependent);
  Step 3a is a weighted-XOR read address phase for a Read-Modify-Write operation;
  Step 3b is a plain-XOR read address phase for a Read-Modify-Write operation;
  Step 4a is a read data phase from DDR memory;
  Step 4b is a subset of step 4a and is a read data phase from DDR memory for plain XOR;
  Step 4c is a subset of step 4a and is a read data phase from DDR memory for weighted XOR;
  Step 5a is a weighted XOR result write phase to DDR memory after the Read-Modify-Write operation;
  Step 5b is a plain XOR result write phase to DDR memory after the Read-Modify-Write operation; and
  Step 5c is a final transaction write back of the result to DDR memory.

Figure 5B:
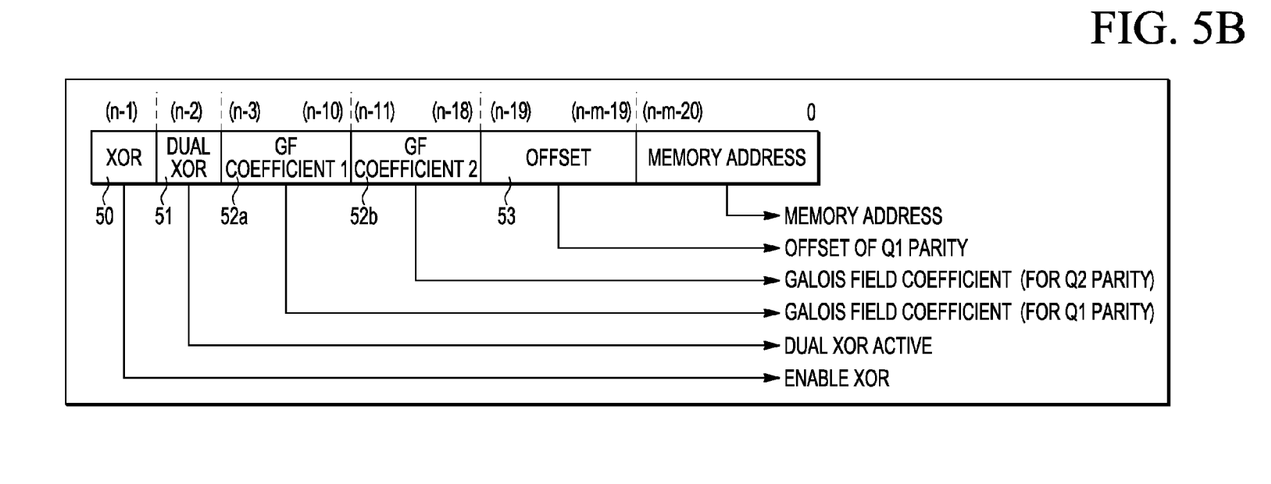
Figure 6:
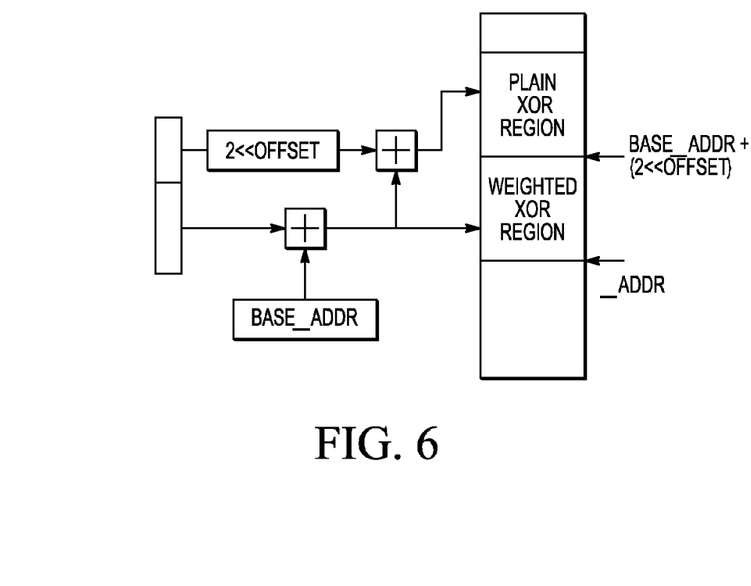
FIG. 6 shows a memory addressing scheme for performing dual XOR according to an embodiment of the present invention.

A variation of the procedure explained above may include two GF-coefficients in an address field as shown in FIG. 5B. In the case of the latter both parities may include weighted-XOR parameters 52a, 52b (for Q1 and Q2 parities respectively). The steps and events as described above may remain unchanged. However, the plain-XOR may be replaced by a weighted-XOR (Q1) and the weighted-XOR described with reference to step 3a may be replaced by a weighted-XOR (Q2).

According to another aspect of the present invention dual parity may be generated in a single pass by using a prior art address bit encoding scheme and instead modifying other parameters in a WXOR_* register to achieve a similar result.

Figure 8:
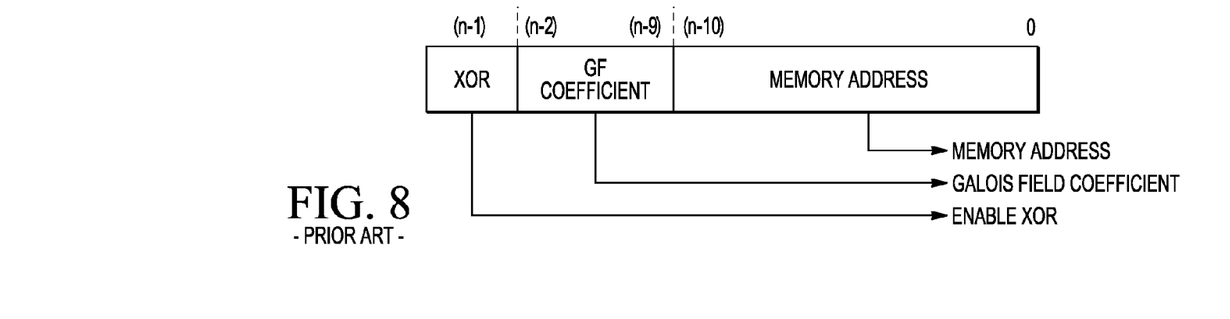
FIG. 8 shows a prior art memory address.

Referring to FIGS. 8 and 9, the present invention may include an address aliasing scheme including the following new fields:
  WXOR_BASE
  WXOR_LENGTH
  WXOR_DEST
  WXOR_MASK The new fields may be held in registers, one set per active data stream. The new fields may be used in a static manner to generate two unique write addresses for storing the dual parities P and Q. The above fields are illustrative only of an address aliasing scheme according to an embodiment of the present invention.

WXOR_BASE and WXOR_LENGTH may create a window in the memory space. If at any time the write address accesses a region within the space of this window, dual-XOR logic in the memory controller may treat it as instructions to generate dual parities. The treatment may be as follows.

Since dual XOR has two destinations, it may generate a second address using "some bits of address" and the WXOR_DEST register. The "some bits of address" may be derived by masking off unwanted address bits from the incoming address. The resultant address may be denoted as an offset wherein the offset is defined as WXOR_MASK & mem_address where "&" is a logical AND operation and is used to mask off certain bits in the address. WXOR_DEST+offset may be the address for "plain XOR", i.e., a parity P of dual parity. BASE_ADDR+"memory address" may be the address for weighted-XOR, i.e., a parity Q of dual parity. If a write address does not fall in this window there may be no treatment to write a transaction.

In one form the memory addressing scheme may be arranged as follows:
  If {XOR}=0: the address range [n-2:0] may contain the usual memory address;
  If {XOR}=1 the weighted XOR result corresponding to parity Q may be stored in (BASE_ADDR+mem_addr), where a memory address is added to BASE_ADDR and resides in any section of an "n" bit address range;
  If {XOR}=1 and if {(BASE_ADDR+mem_addr–WXOR_ BASE)<WXOR_LENGTH} the plain XOR result corresponding to parity P may be stored in WXOR_DEST+(WXOR_MASK & mem_addr) wherein WXOR_BASE+WXOR_LENGTH creates a window. Dual XOR (plain-XOR) may be enabled if (BASE_ADDR+mem_addr) falls in the window. The result of plain-XOR may be directed to (WXOR_DEST+offset) wherein offset is defined as (WXOR_MASK & mem_addr).

Figure 10:
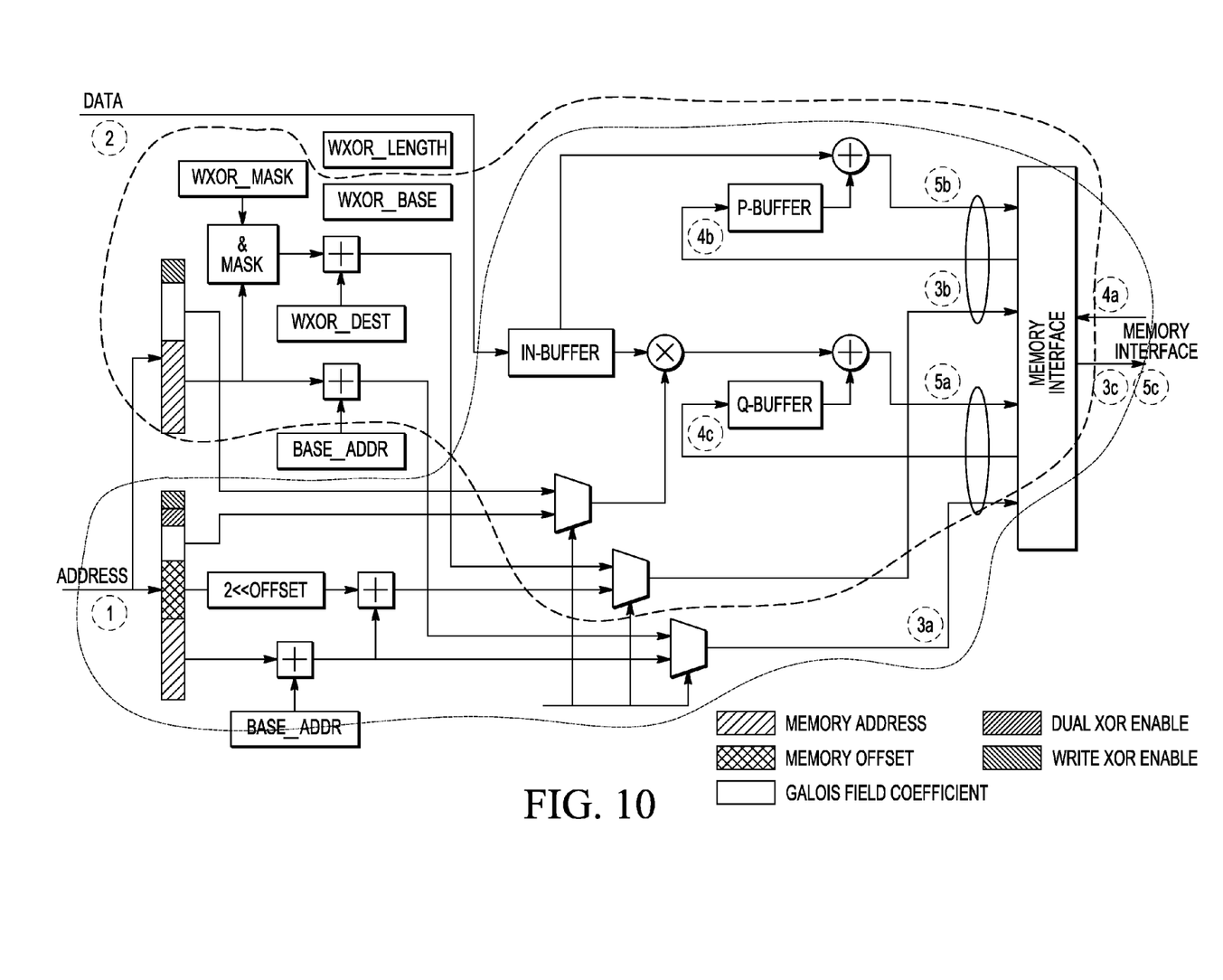
FIG. 10 shows details of a memory controller including a dual XOR generating logic engine.

FIG. 10 shows details of a memory controller including a logic circuit for writing dual XOR to memory as shown in FIG. 7 and a logic circuit for performing dual XOR as shown in FIG. 9. The top portion of FIG. 10 illustrates a scheme used to generate two addresses which is required to perform two Read-Modify-Write operations. As described above two addresses may be generated using the WXOR * register and mem addr (refer steps 1 to 5 described above with reference to FIG. 7).

Figure 11:
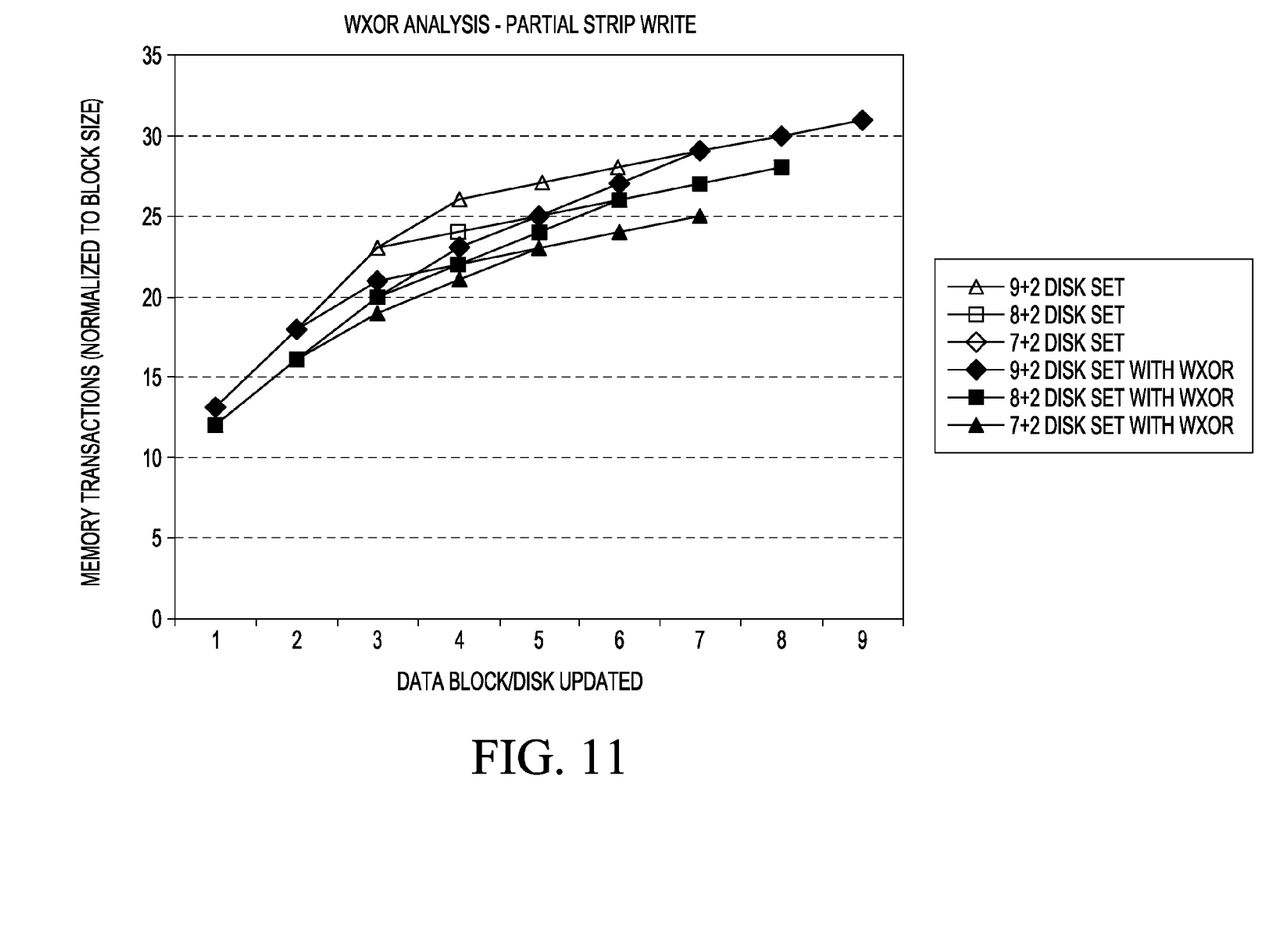
FIG. 11 shows an analysis for a partial strip write for various disk sets with and without dual XOR.

FIG. 11 shows in graphical form an analysis of memory transactions required for 16+2, 15+2 and 14+2 disk sets with and without dual XOR. For example in a 16+2 disk set (denoting 16 data disks and 2 parity disks) dual XOR achieves a useful reduction in memory transactions over a range of updated data blocks compared to a 16+2 disk set without dual XOR. Similar comments apply to 15+2 and 14+2 disk sets as shown in FIG. 11.

Figure 12:
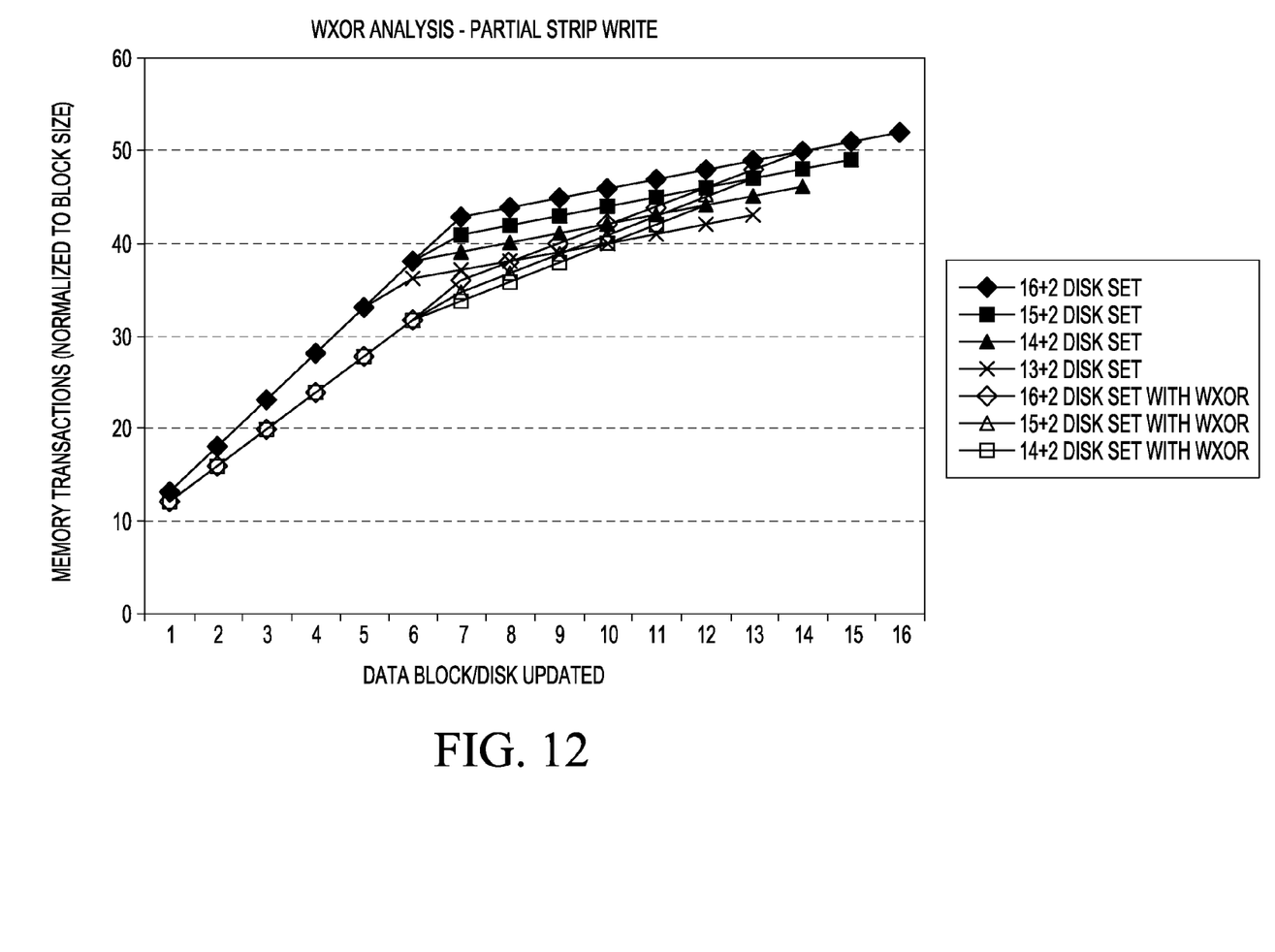
FIG. 12 shows an analysis for a partial strip write for various disk sets with and without dual XOR.

FIG. 12 shows a similar analysis of memory transactions for 9+2, 8+2 and 7+2 disk sets with and without dual XOR. Again it is apparent that a useful reduction in memory transactions is achieved over a range of updated data blocks when compared to disk sets without dual XOR.

Figure 13:
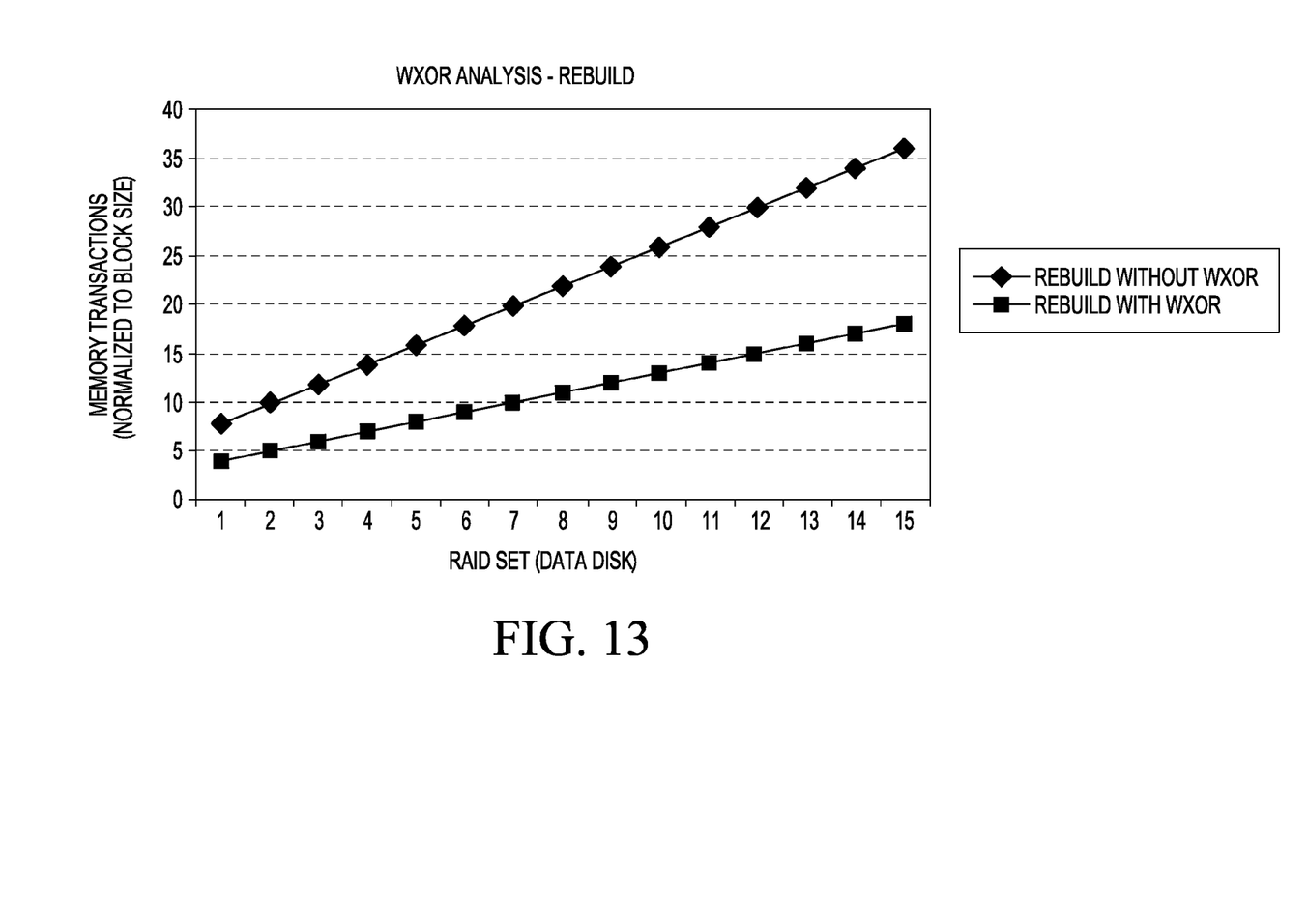
FIG. 13 shows an analysis for a disk rebuild with and without dual XOR.

FIG. 13 shows an analysis of memory transactions required for rebuilding RAID data disks without (upper graph) and with (lower graph) dual XOR. Again it is apparent that with implementation of dual XOR the number of memory transactions required to rebuild a RAID data disk is lower when compared to data disks without dual XOR.

The reason for the reduced number of transactions is that without dual XOR it takes two passes of the same data to generate parities P and Q for RAID-6:

(1) WXOR (plain)
(2) WXOR (weighted)

In contrast dual XOR according to the present invention may generate parities P and Q in a single pass:

(1) WXOR (plain and weighted)

This results in less data movement and hence better bus utilization. It may also require less CPU overhead since it may issue a single command instead of two. Total latency of the system to generate dual parities may also be reduced.

Concurrent parity generation according to the present invention offers advantages over existing solutions in which parity is generated one at a time. The arrangement of the present invention may not require replacement of a RAID HW engine but rather an addendum.

The arrangement of the present invention may provide dual parity generation and storage in a single pass, minimizing bus usage and time required to generate parity, which may be crucial for system performance. The arrangement of the present invention may also minimize CPU overhead in terms of management of tasks and allow for a reduced memory footprint.

Finally, it is to be understood that various alterations, modifications and/or additions may be introduced into the constructions and arrangements of parts previously described without departing from the spirit or ambit of the invention.

The invention claimed is:

1. In a Redundant Array of Independent Discs (RAID) memory disc array, an apparatus for generating dual parities P and Q, the apparatus comprising:
    a dual XOR engine for performing a plain XOR operation for parity P and for performing a weighted XOR operation for parity Q;
    wherein said plain and weighted XOR operations are performed in a single pass; and
    a memory controller having a memory addressing arrangement including a dual XOR field parameter and an offset field parameter for encoding instructions for generating said dual parities.

2. The apparatus of claim 1, wherein said dual parities are represented by two respective write addresses.

3. The apparatus of claim 1, wherein said dual XOR engine is adapted to perform plain and weighted XOR operations during a Write XOR operation (WXOR).

4. The apparatus of claim 3, wherein said WXOR operation includes a memory mapped Read-Modify-Write operation.

5. The apparatus of claim 1, wherein said memory controller includes a WXOR_BASE field and a WXOR_LENGTH field for defining a window such that said controller interprets data in said window as instructions for generating write addresses for said dual parities.

6. The apparatus of claim 5, wherein an address is defined by said WXOR_BASE field plus a memory address.

7. The apparatus of claim 1, wherein said memory controller includes a WXOR_DEST field and a WXOR_MASK field for defining addresses for said plain and weighted XOR operations.

8. The apparatus of claim 7, wherein an address is defined by said WXOR_DEST field plus an offset, and said offset is defined by said WXOR_MASK field plus a memory address.

9. In a Redundant Array of Independent Discs (RAID) memory disc array, a method for generating dual parities P and Q, the method comprising:
    performing a plain XOR operation for parity P; and
    performing a weighted XOR operation for parity Q, wherein said plain and said weighted XOR operations are performed in a single pass, and wherein said disk array includes a memory controller having a memory addressing arrangement including a dual XOR field parameter and an offset field parameter for encoding instructions for generating said dual parities.

10. The method of claim 9, wherein said dual parities are represented by two respective write addresses.

11. The method of claim 9, wherein said disk array includes a dual XOR engine adapted to perform said plain and weighted XOR operations during a Write XOR operation (WXOR).

12. The method of claim 11, wherein said WXOR operation includes a memory mapped Read-Modify-Write operation.

13. The method of claim 11, wherein said memory controller includes a WXOR _ASE field and a WXOR_LENGTH field for defining a window such that said memory controller interprets data in said window as instructions for generating write addresses for said dual parities.

14. The method of claim 13, wherein an address is defined by said WXOR_BASE field plus a memory address.

15. The method of claim 11, wherein said memory controller including a WXOR_DEST field and a WXOR_MASK field for defining addresses for said plain and weighted XOR operations.

16. The method of claim 15, wherein an address is defined by said WXOR_DEST field plus an offset, and said offset is defined by said WXOR_MASK field plus a memory address.

* * * * *

UNITED STATES PATENT AND TRADEMARK OFFICE
CERTIFICATE OF CORRECTION

PATENT NO. : 8,239,625 B2
APPLICATION NO. : 12/692637
DATED : August 7, 2012
INVENTOR(S) : Girish A. Madpuwar It is certified that error appears in the above-identified patent and that said Letters Patent is hereby corrected as shown below:

At column 8, line 36, please change "WXOR_ASE" to be --WXOR_BASE--

Signed and Sealed this
Twenty-sixth Day of February, 2013

Teresa Stanek Rea
*Acting Director of the United States Patent and Trademark Office*